ID[19] United States Patent
Sakakiyama

[11] Patent Number: 4,836,322
[45] Date of Patent: Jun. 6, 1989

[54] POWER TRANSMISSION SYSTEM FOR A FOUR-WHEEL DRIVE VEHICLE

[75] Inventor: Ryuzo Sakakiyama, Tokyo, Japan

[73] Assignee: Fuji Jukogyo Kabushiki Kaisha, Tokyo, Japan

[21] Appl. No.: 159,640

[22] Filed: Feb. 23, 1988

[30] Foreign Application Priority Data

Feb. 27, 1987 [JP] Japan .................. 62-046600

[51] Int. Cl.$^4$ ............................. B60K 17/34
[52] U.S. Cl. .................. 180/247; 180/197; 180/248
[58] Field of Search .............. 180/247, 248, 197; 364/424.1, 426

[56] References Cited

U.S. PATENT DOCUMENTS

| | | | |
|---|---|---|---|
| 4,466,502 | 8/1984 | Sakai | 180/247 |
| 4,556,134 | 12/1985 | Takano | 180/247 |
| 4,576,061 | 3/1986 | Yamakawa et al. | 180/247 |
| 4,586,583 | 5/1986 | Yamakawa et al. | 180/247 |

FOREIGN PATENT DOCUMENTS 58-133922  8/1983  Japan .................. 180/247

Primary Examiner—Charles A. Marmor
Assistant Examiner—Donn McGiehan
Attorney, Agent, or Firm—Martin A. Farber

[57] ABSTRACT

A power transmission system for a four-wheel drive vehicle has an automatic transmission for transmitting power of an engine to main driving wheels and a transfer clutch for transmitting the power to auxiliary driving wheels. First and second vehicle speed sensors are provided for sensing vehicle speed dependent on the main driving wheels and the auxiliary driving wheels, respectively. A two-wheel drive switch is provided for producing a two-wheel drive signal. The automatic transmission uses an output signal of the first vehicle speed sensor as data representing driving conditions of the vehicle. In response to the two-wheel drive signal, the transfer clutch is disengaged and an output signal of the second vehicle speed sensor is selected as vehicle speed.

8 Claims, 6 Drawing Sheets

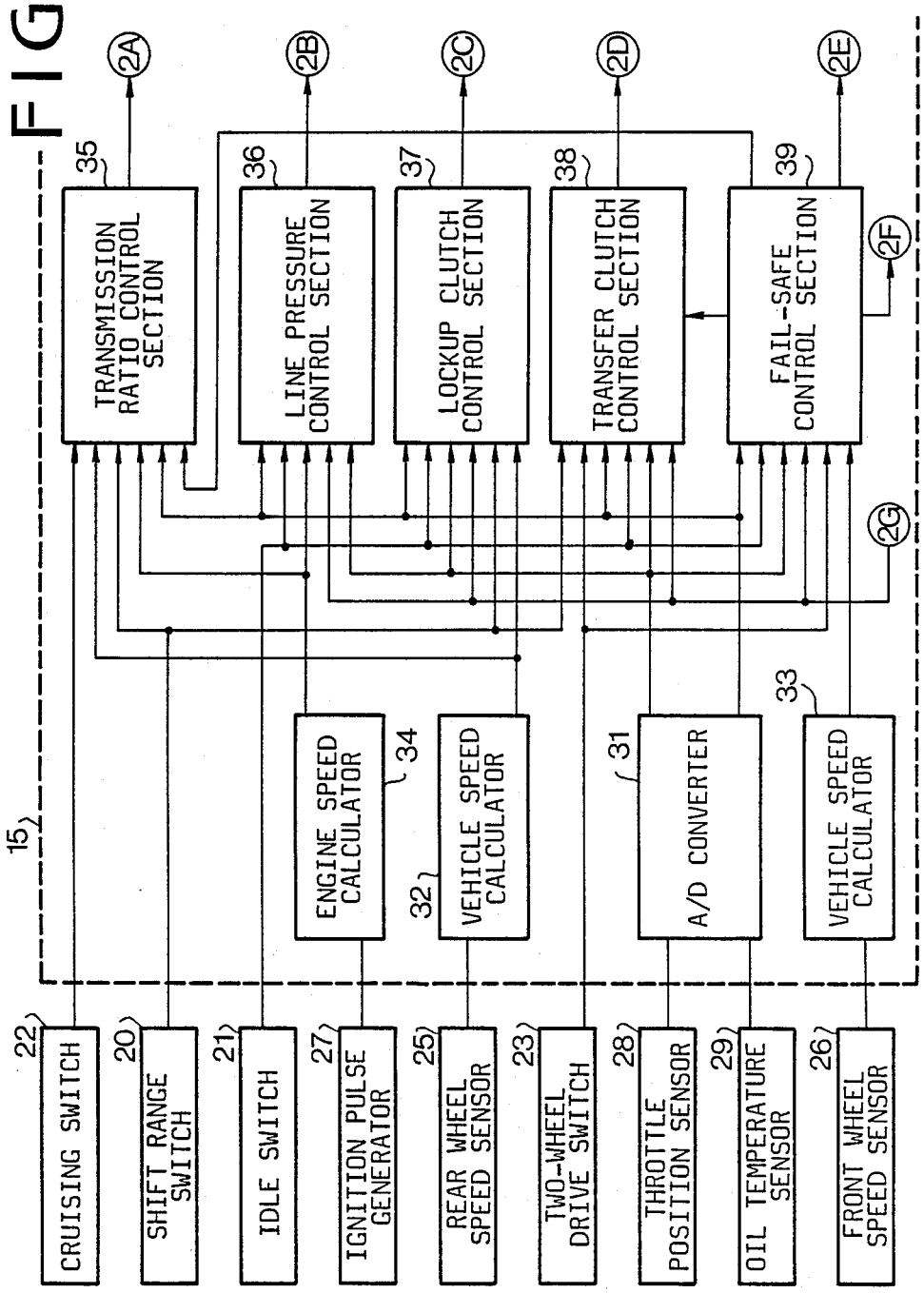

POWER TRANSMISSION SYSTEM FOR A
FOUR-WHEEL DRIVE VEHICLE

BACKGROUND OF THE INVENTION

The present invention relates to a system for a four-wheel drive vehicle in which a power transmission system is changed from a four-wheel drive system to a two-wheel drive system or vice versa in accordance with driving conditions.

A four-wheel drive vehicle which is provided with a transfer clutch for transmitting power of an engine to two auxiliary driving wheels for establishing four-wheel drive is known.

In such a four-wheel drive vehicle, when inspection with respect to structure of the vehicle, engine performance, the emission control system, and other factors take place, main driving wheels are mounted on a free roller and the auxiliary driving wheels are fixed.

U.S. Pat. No. 4,556,134 discloses a four-wheel drive power transmissions system, in which a transfer clutch for the auxiliary driving wheels can be disengaged by operating a switch in order to carry out inspection of the vehicle.

On the other hand, a four-wheel drive vehicle with an automatic transmission has a vehicle speed sensor for controlling the automatic transmission. Since main driving wheels are liable to skid, a sensor is provided for sensing the speed of the auxiliary driving wheels as the vehicle speed. For fail safe, another sensor for sensing the speed of the main driving wheels is provided for use when the sensor for the auxiliary driving wheels fails. The speed of the auxiliary driving wheels is used as vehicle speed to control the transfer clutch. However, since the auxiliary driving wheels must be fixed during the inspection of the vehicle, the vehicle speed can not be detected.

SUMMARY OF THE INVENTION

The object of the present invention is to provide a four-wheel drive power transmission system wherein vehicle speed can be obtained even at compulsive two-wheel driving.

The present invention will be more apparent from the following description made with reference to the accompanying drawings.

BRIEF DESCRIPTION OF DRAWINGS

FIGS. 2a and 2b show a block diagram of a control unit provided in the system of the present invention;

DETAILED DESCRIPTION OF THE PREFERRED EMBODIMENTS

Figure 1:
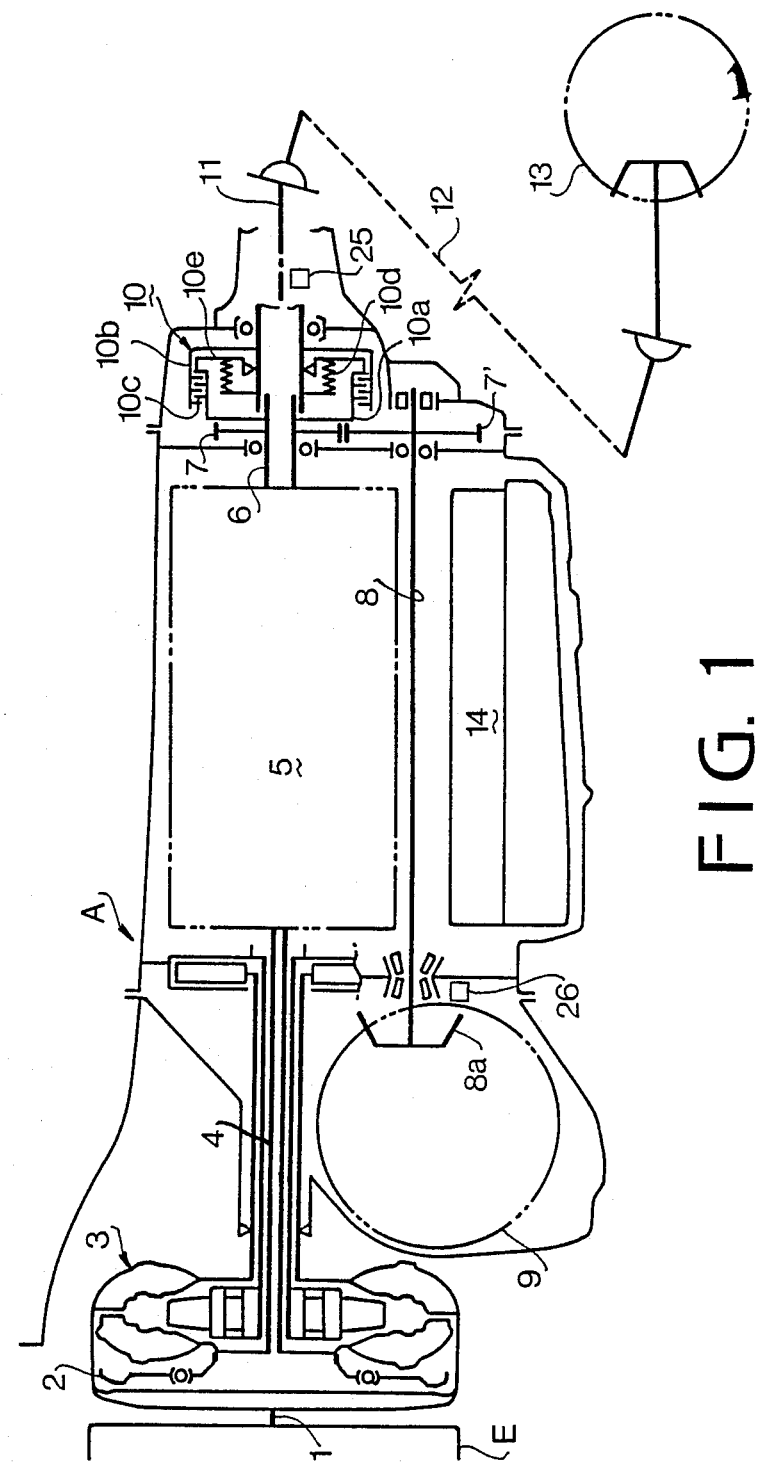
FIG. 1 is a schematic view showing a four-wheel drive power transmission system according to the present invention.

Referring to FIG. 1, an internal combustion engine E is mounted on a front portion of a vehicle. A crankshaft 1 of the engine E is operatively connected with a torque converter 3 having a lockup clutch 2 of an automatic transmission A. The automatic transmission A comprises the torque converter 3, and an automatic transmission device 5 operatively connected with the torque converter 3 through an input shaft 4.

The output of the automatic transmission device 5 is transmitted to an output shaft 6 on which a drive gear 7 is securely mounted and which in turn engages with a driven gear 7'. The driven gear 7' is securely mounted on a front drive shaft 8, which is integral with a drive pinion 8a engaged with a crown gear 9 of a final reduction device for the front wheels. The output shaft 6 is connected to a rear drive shaft 11 through a transfer clutch 10 which is in a form of a fluid operated multiple-disc friction clutch. The rear drive shaft 11 is further operatively connected to a final reduction device 13 for rear wheels of the vehicle through a propeller shaft 12.

The transfer clutch 10, which operates to connect the output shaft 6 and the rear drive shaft 11, comprises a hub 10a secured to the output shaft 6, a drum 10b secured to the rear drive shaft 11 and a plurality of inner and outer discs 10c mounted on the hub 10a and the drum 10b, respectively. A spring 10d is provided to urge the discs 10c so as to be disengaged with each other. An oil chamber 10e of transfer clutch 10 is supplied with pressurized oil through a solenoid operated valve, output shaft 6, and rear drive shaft 11 to engage the discs 10c, thereby transmitting torque to the rear wheels. The solenoid operated valve is provided in an oil control device 14 which is provided under the front drive shaft 8 and controlled by a control unit 15.

Figure 2B:
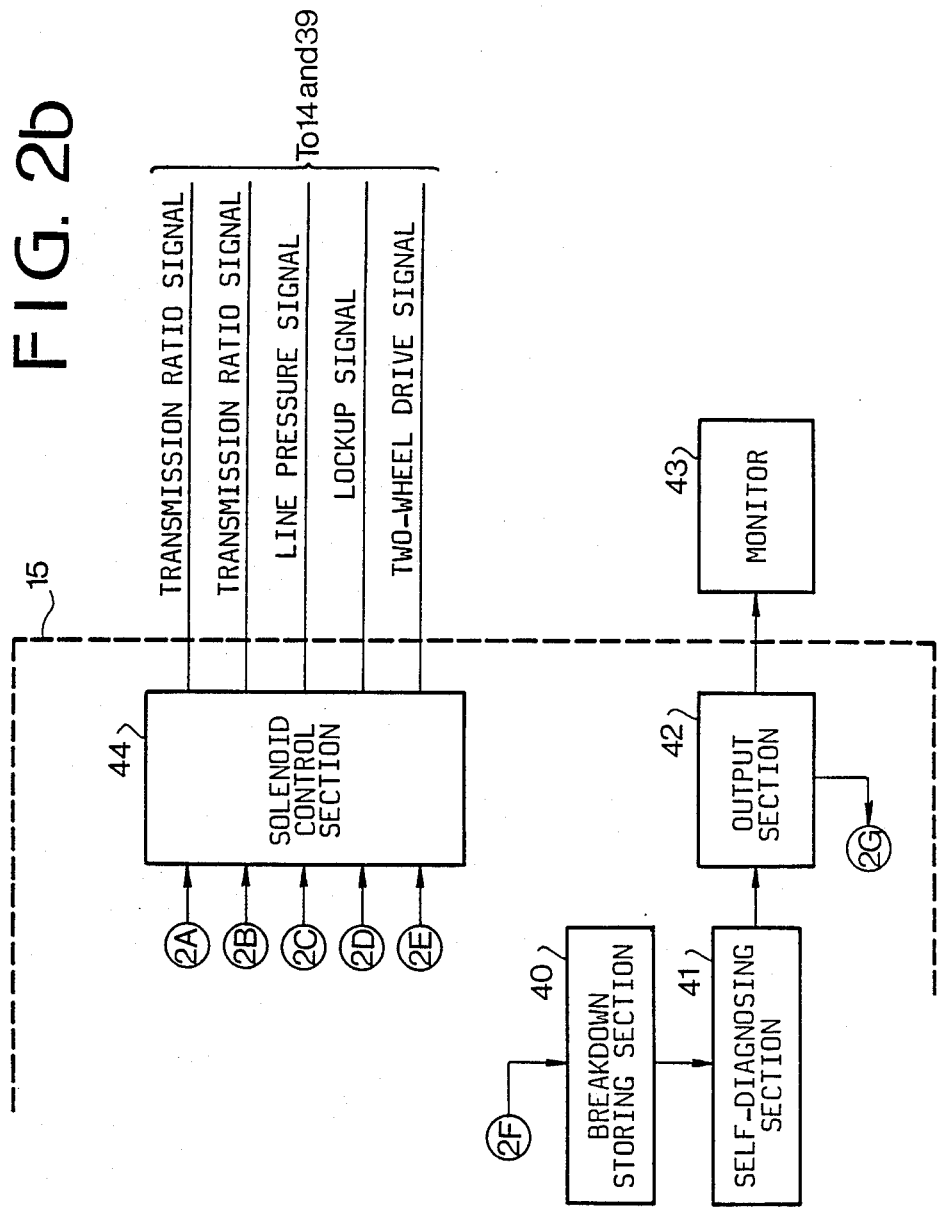

Referring to FIGS. 2a and 2b, a control system of the present invention has a shift range switch 20 for producing a range signal in accordance with the position of a selector lever, an idle switch 21 and a cruising switch 22. A two-wheel drive switch 23 is closed for changing the four-wheel drive upon demand to two-wheel drive, for example, at an inspection. A rear wheel speed sensor 25 is provided adjacent the rear drive shaft 11 and a front wheel speed sensor 26 is provided adjacent the crown gear 9 as shown in FIG. 1 to detect vehicle speed, respectively. The vehicle speed is calculated in calculators 32 and 33 by multiplying the frequency F of the pulses from each sensor by a constant k. An ignition pulse generator 27 produces pulses dependent on ignition pulses from an ignition coil. Based on the pulses, a calculator 34 calculates engine speed. A throttle position sensor 28 and an oil temperature sensor 29 are also provided. The output signals and pulses of the switches 20 to 23, sensors 25, 26 and generator 27 are applied to the control unit 15 which controls the automatic transmission device 5 and the transfer clutch 10 in dependency on the input signals. Output signals of the throttle position sensor 28 and the oil temperature sensor 29 are applied to the control unit 15 through an analogue to digital converter 31.

The control unit 15 is provided with a transmission ratio control section 35, line pressure control section 36, lockup clutch control section 37, transfer clutch control section 38 and fail-safe control section 39. The transmission ratio control section 35 is applied with output signals of the shift range switch 20 and cruising switch 22, vehicle speed signal from calculators 32, throttle position signal from A/D converter 31, fail-safe control signal from fail-safe signal control section 39, and engine speed signal from the calculator 34 to change the transmission ratio at each driving range. The line pressure control section 36 is applied with output signals of the idle switch 21, oil temperature sensor 29, throttle position sensor 28, self-diagnosing output signal and engine speed signal from the calculator 34 to control the line pressure in the automatic transmission device 5 in the steady state, transmission ratio changing state and at the start of the vehicle. The lockup clutch control section 37 produces an output to lock up the lock clutch under predetermined driving conditions detected by the shift range switch 20, idle switch 21, oil temperature sensor 29, throttle position sensor 28, rear wheels speed sensors 25, and self-diagnosing output signal from self-diagnosing output section 42. The transfer clutch control section 38 controls the oil pressure in the transfer clutch 10 in dependency on the output signals of the shift range switch 20, idle switch 21, two-wheel drive switch 23, throttle position sensor 28, self-diagnosing output signal from self-diagnosing output section 42 and oil temperature sensor 29. The fail-safe control section 39 produces an output signal to disengage the transfer clutch 10 when one of the sensors, switches or sections of the control unit 15 breaks down, or when the two-wheel drive switch 23 is closed. The output signals of the sections 35 to 39, namely, the transmission ratio signal, line pressure signal, lockup signal and two-wheel drive signal, are applied to the oil pressure control device 14 and the fail-safe control section 39 through a solenoid control section 44. If these signals applied to the fail-safe control section 39 break down, the fail-safe control section produces an output signal to disengage the transfer clutch 10 as aforementioned. The output signal of the fail-safe control section 39 is also fed to the transmission ratio control section 35.

The control unit 15 further comprises a failure breakdown storing memorizing section 40 for storing a failure part or section and a self-diagnosing section 41 for diagnosing the failure. The output signal of the self-diagnosing section 41 is applied to a monitor 43 through an self-diagnosing output section 42, for indicating the failure section stored in the memorizing section 40 on the monitor 43.

Figure 3:
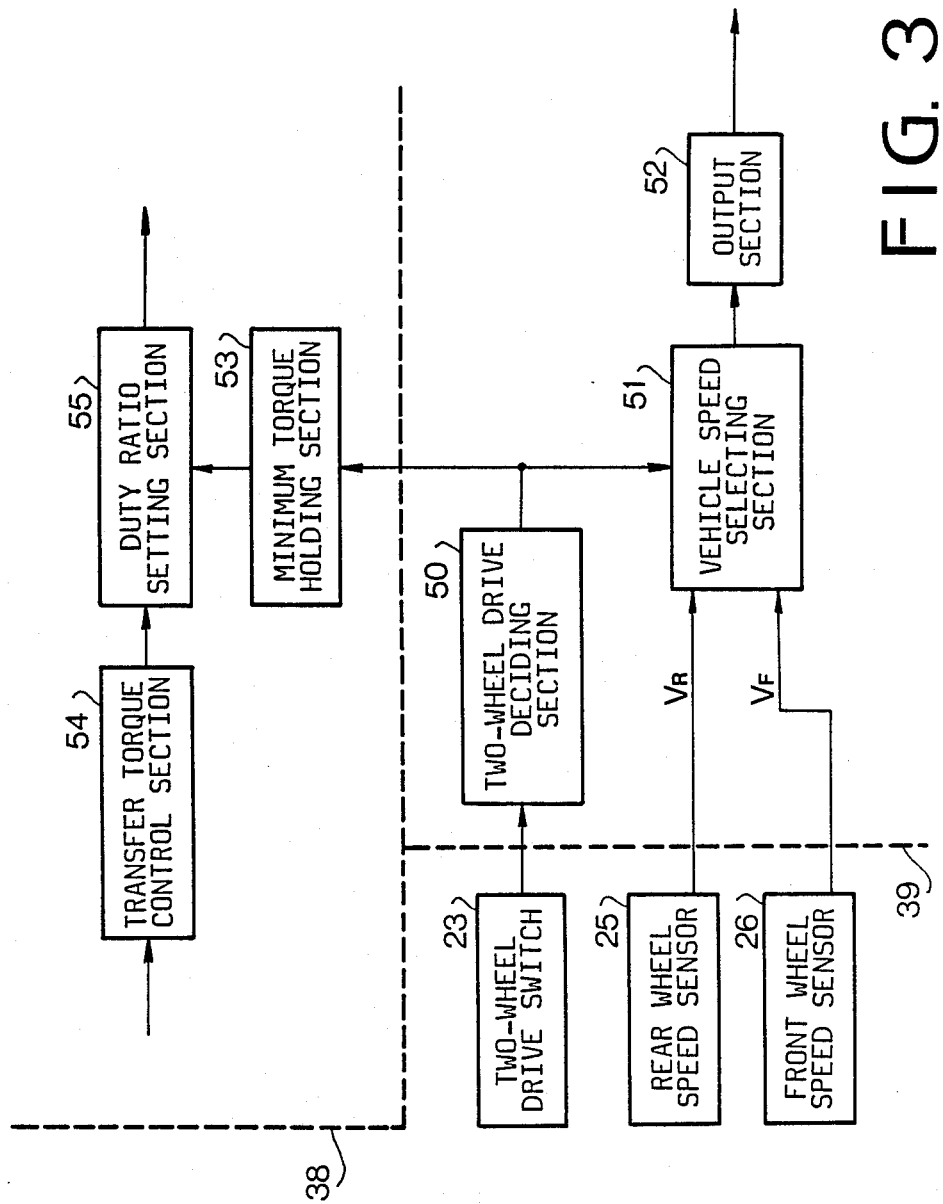
FIG. 3 is a detailed block diagram of a part of the control unit shown in FIGS. 2a and 2b.

Referring to FIG. 3 showing the transfer clutch control section 38 and fail-safe control section 39 in detail, the transfer clutch control section 38 is provided with a transfer clutch torque control section 54, a duty ratio setting section 55 and a minimum torque holding section 53. The transfer torque control section 54 controls the transmission torque of the transfer clutch 10 in dependency on the driving conditions. The output signal of the transfer torque control section 54 is applied to the duty ratio setting section 55, where duty ratio of pulses for operating the solenoid of the valve is determined.

The fail-safe control section 39 has a two-wheel drive deciding section 50 which applies a two-wheel drive signal to a vehicle speed selecting section 51 when the two-wheel drive switch 23 is closed. The vehicle speed selecting section 51, to which a rear wheel speed signal $V_R$ of the rear wheel speed sensor 25 and a front wheel speed signal $V_F$ of the front wheel speed sensor 26 are applied, selects one of the speeds. The selected speed is applied to corresponding sections of the control unit 15 through an output section 52.

The two-wheel drive signal of the two-wheel drive deciding section 50 is further supplied to a minimum torque holding section 53 which applies a minimum torque signal to the duty ratio setting section 55 to change the duty ratio to reduce the transmission torque of the transfer clutch 10 to a minimum. Thus, the transfer clutch 10 is disengaged to establish the two-wheel drive.

The operation of the present invention is described with reference to the flowcharts of FIGS. 4a and 4b.

Figure 4A:
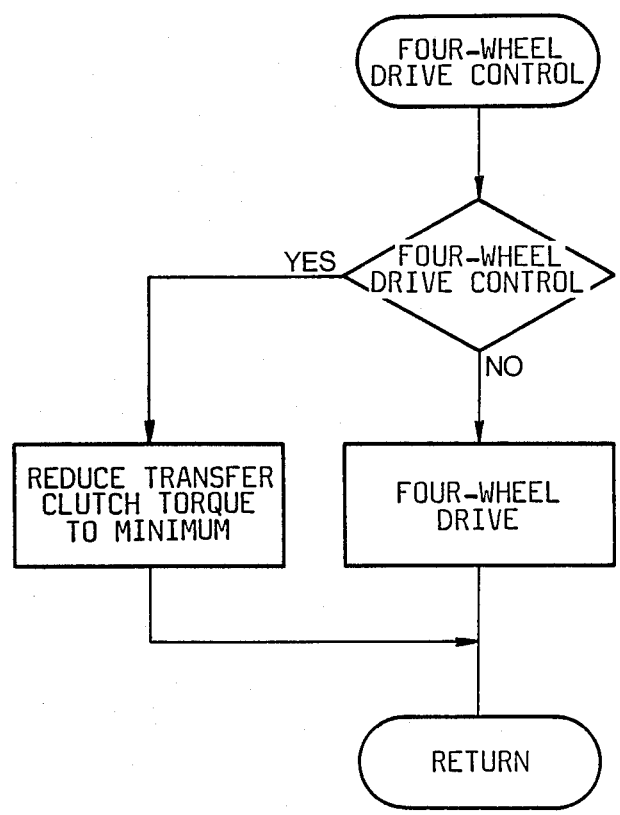
FIGS. 4a and 4b are flowcharts showing the operation of the present invention.
Figure 4B:
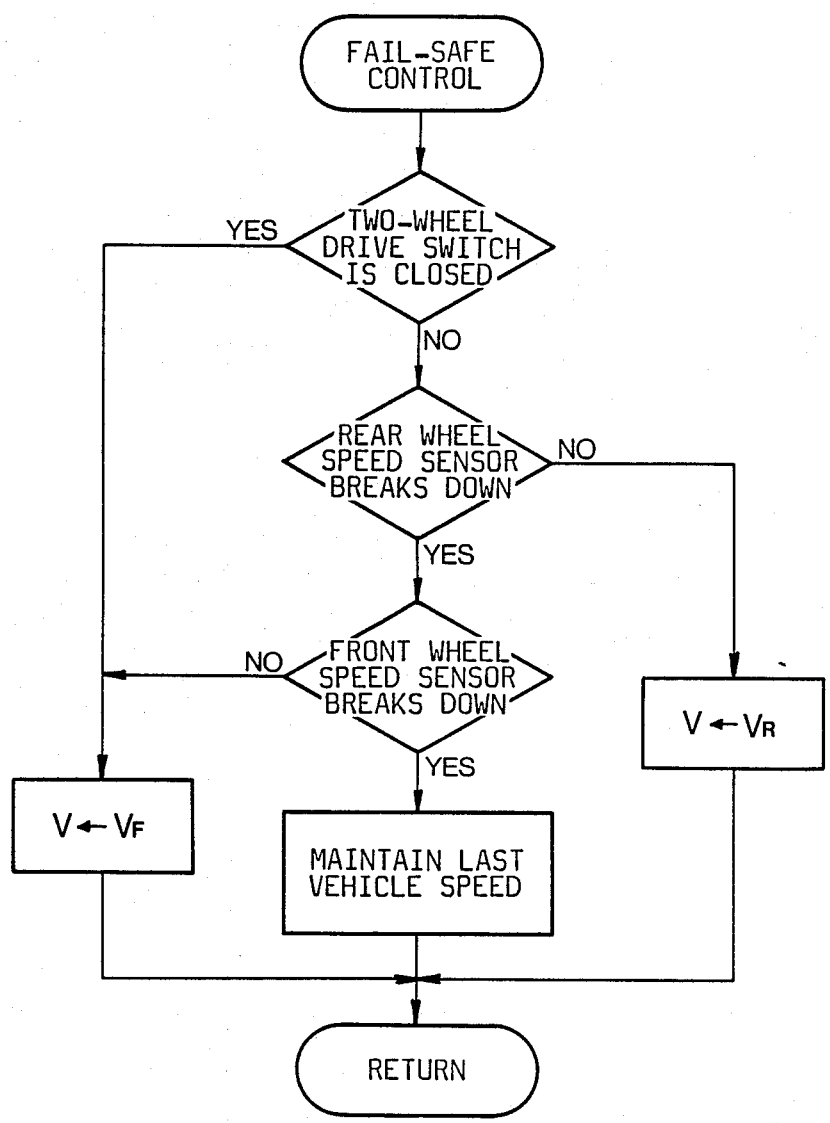

When the vehicle is driven on roads, the two-wheel drive switch is open so that four-wheel drive is provided as shown in the flowchart of FIG. 4a. As shown in FIG. 4b, during the four-wheel drive, the rear wheel speed signal $V_R$ is selected as vehicle speed at the vehicle speed selecting section 51. When the rear wheel speed sensor 25 fails to operate, it is determined whether the front wheel speed sensor 26 has a failure or not. If the front wheel speed sensor 26 is normally operated, the vehicle speed selecting section 51 selects a front wheel speed signal $V_F$ as the vehicle speed. If the front wheel speed sensor 26 is also out of order, a vehicle speed detected at the previous routine is used.

On the other hand, when the two-wheel drive switch 23 is closed at the inspection, the two-wheel drive deciding section 50 applies the two-wheel drive signal to the vehicle speed selecting section 51 to select the front wheel speed signal $V_F$ as the vehicle speed. At the same time, the two-wheel drive signal of the two-wheel drive deciding section 50 is applied to the duty ratio setting section 55 through the minimum torque holding section 53 to provide a duty ratio corresponding to a minimum torque, in the present embodiment, 100%. Thus, the oil pressure in chamber 10e of the transfer clutch 10 becomes low, so that the clutch 10 is disengaged. Accordingly, torque is not transmitted to the rear wheels so that two-wheel drive is provided.

In accordance with the present invention, the vehicle can be safely switched from the four-wheel drive to two-wheel drive at inspection of the vehicle by disengaging a transfer clutch provided to transmit torque to the auxiliary driving wheels. At the same time, the vehicle speed sensor detecting the speed of the main driving wheels is selected at the two-wheel driving so that the control unit can be normally operated.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a power transmission system for a four-wheel drive vehicle powered by an engine, having an automatic transmission for operatively transmitting power of the engine to main and auxiliary driving wheels of the four-wheel drive vehicle, vehicle driving condition detecting means for detecting driving conditions of the engine and transmission, shift range detecting means to detect a shift range of the transmission, idle speed detecting means to detect idling speed of the engine, throttle position detecting means for detecting opening degree of a throttle valve mounted on the engine, oil temperature detecting means for detecting oil temperature of the engine, and first and second vehicle speed calculating means for calculating vehicle speed responsive to speed of the main and auxiliary driving wheels, respectively, and transfer clutch means for continuously and variably transmitting the power of the engine to the auxiliary driving wheels simultaneously with transmission of the power to the main driving wheels via the transmission in dependency on the driving conditions to provide four-wheel driving, the improvement of the system which comprises, fail safe control means for producing an output signal to disengage said transfer clutch means when at least one of said detecting means breaks down, so as to establish two-wheel driving at a malfunction of said at least one detecting means.

2. The power transmission system according to claim 1 wherein said automatic transmission uses an output signal of said first vehicle speed calculating means as a data representing driving conditions of said vehicle.

3. The system according to claim 1, further comprising,
two-wheel drive switch means for producing an output signal at a closed position thereof by manipulation,
the fail safe control means is responsive to said output signal of the two-wheel drive switching means for producing the output signal of the fail safe control means to disengage said transfer clutch means, so as to establish the two-wheel drive by disengaging the transfer clutch means for the auxiliary driving wheels and to normally operate the automatic transmission at inspection of the vehicle.

4. The system according to claim 1, further comprising
failure breakdown storing memorizing means for storing a failure detecting means, and
self-diagnosing section means for diagnosing the failure.

5. The system according to claim 4, further comprising
monitor means connected to an output of the self-diagnosing section means via a self-diagnosing output section for indicating the failure detecting means stored in the memorizing means.

6. The system according to claim 3, wherein
the fail safe control means comprises a two-wheel drive deciding means for applying a two-wheel drive signal to a vehicle speed selecting section of the fail safe control means when the two-wheel drive switch means is in the closed position.

7. The system according to claim 6, further comprising
minimum torque holding means responsive to said two-wheel drive signal for applying a minimum torque signal for reducing transmission torque of the transfer clutch means to a minimum.

8. The system according to claim 1, further comprising
detecting means for detecting speed of the main driving wheels,
detecting means for detecting speed of the auxiliary driving wheels,
control section means connected to at least one of said detecting means and said calculating means for controlling the transmission and the transfer clutch means,
said fail safe control means for producing said output signal to disengage said transfer clutch means when at least one of said detecting means and control section means, respectively, breaks down, so as to establish the two-wheel driving at a malfunction of said at least one detecting means and control section means, respectively.

* * * * *